Patented May 23, 1944

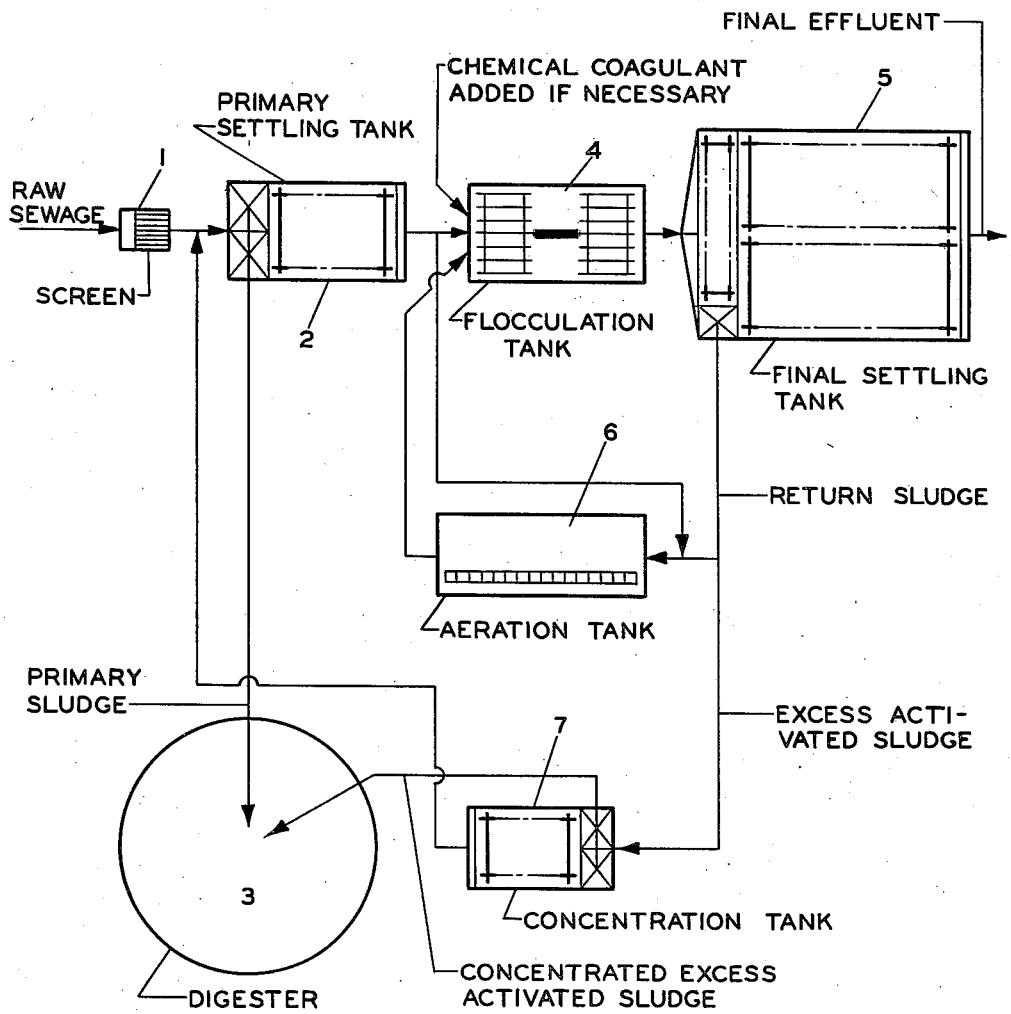

2,349,390

UNITED STATES PATENT OFFICE 2,349,390

SYSTEM FOR TREATING SEWAGE

Samuel L. Tolman, Columbus, Ohio, assignor to The Jeffrey Manufacturing Company, a corporation of Ohio Application May 16, 1942, Serial No. 443,237

15 Claims. (Cl. 210—2)

This invention relates to a system and method for treating sewage.

An object of the invention, therefore, is to provide an improved system and method of treating sewage involving activated sludge in which the size and consequently the cost of the equipment is materially reduced without impairing the efficiency of the system or method.

Other objects of the invention will appear hereinafter, the novel features and combinations being set forth in the appended claims.

In the single figure of the accompanying drawing there is shown diagrammatically the system comprising my invention, which system is also adapted to carry out the method of my invention.

As illustrated in the drawing, the system is quite complete as to the fundamental and essential parts although control valves, pumps and the like, are not illustrated, but such may be employed in a manner obvious to those skilled in this art. In certain broader aspects of the invention as defined by the claims, certain apparatus or the equivalent, such as illustrated in the drawing, is not required.

Referring to the complete and preferred embodiment of my invention, as disclosed in the drawing, it will be seen that the raw sewage is conducted first through a screen 1, such as a bar screen, to remove large matter which is essentially inorganic. The raw sewage flows from the screen to the influent of a primary settling tank 2 in which the large particles of organic matter are settled to form sludge, which sludge is collected and preferably delivered direct to a digester 3. The effluent from the primary settling tank 2, except for a part which may be diverted, is delivered to the influent end of a flocculation tank 4 which is preferably provided with mechanical agitating or flocculating mechanism to insure a thorough mixing of the sludge therein with the returned activated sludge and possibly with a chemical coagulant, as hereinafter described more completely.

From the flocculation tank 4, the sewage flows to a final settling tank 5, the effluent of which is discharged, as for example, to a stream. As above stated, the method involved is essentially of the activated sludge type and the sludge settling in the final settling tank 5 will be activated sludge. This activated sludge is collected and part of it is returned to an aeration tank 6 where the activated sludge is aerated so as to increase very appreciably the activity of the organisms so that when this activated sludge is mixed with the raw sewage in the flocculation tank 4 it will quickly and continuously absorb the organic matter in the sewage delivered thereto. The excess portion of the activated sludge which is not delivered to the aeration tank 6 is delivered to a sludge concentration tank 7 where the sludge is concentrated, the effluent liquid being preferably returned to the primary settling tank 2, for example to the influent thereof and the concentrated excess activated sludge being delivered to the digester 3 for digestion.

As is well known, activated sludge is rather light and dilute and it is for this reason that the concentration tank 7 is employed so as not to overload the digester with excess liquid. The activated sludge which is delivered to the aeration tank 6, where, due to aeration, its oxidization ability is highly increased, is then delivered to the flocculation tank 4 and preferably to the influent thereof. In order to get the best action in the aeration tank 6 it is necessary that very dilute sludge (solid content preferably not over 0.5%) be returned to it.

It is also preferred, in the complete system and method of my invention, to add a small amount of sewage effluent from the primary settling tank 2, or raw sewage, to the aeration tank 6, and this is preferably done by delivering it to the influent of said aeration tank 6. This sewage serves to provide food for the bacteria present in the activated sludge which is returned from the final settling tank 5. As an illustration of the preferred method, this may constitute from 10 to 25% of the volume of the effluent from the primary settling tank 2, or of the raw sewage should said primary settling tank 2 be eliminated. It is thus evident that since the aeration takes place in the tank 6 the volume of the liquid flowing therethrough is much less in a given period of time than the volume of the liquid flowing through the flocculation tank 4, or the volume which would flow through an aeration tank if it were interposed between the primary settling tank 2 and the final settling tank 5, as is the arrangement in the standard activated sludge system. As a consequence, the aeration tank may be considerably smaller than in the standard activated sludge system and even the aeration tank 6 and the flocculation tank 4 will be considerably smaller and considerably less expensive than the aeration tank necessary in the standard activated sludge system. Furthermore, the flocculation tank 4, particularly in view of the provision of mechanical agitation therein, will insure a thorough mixing of the activated sludge from the aeration tank 6 and the effluent from the primary settling tank 2, thus assuring a very efficient action of the consuming organisms on the organic matter. If it is considered desirable or necessary, for example if a higher degree of purification is desired to be produced by the apparatus and process so far described, a chemical coagulant can be added to the flocculation tank 4, and preferably to the influent thereof, as with the effluent flowing from the primary settling tank 2. Such a coagulant may be ferric chloride, FeCl₃, or alum, Al₂(SO₄)₃. In the preferred embodiment of my invention the primary settling tank 2 is employed as it is quite important to the efficiency of the entire system.

In the operation of the system, the raw sewage is first screened by the screen 1 and then it flows in the primary settling tank 2 where the large particles of organic matter are settled, removed and delivered to the digester 3. The effluent from the primary settling tank 2 flows principally to the flocculation tank 4. Part of it, if desired but not necessarily, may be diverted to the influent of the aeration tank 6. Very active activated sludge from the aeration tank 6 is also delivered to the flocculation tank 4 and preferably to the influent thereof, for example, it may be mixed with the effluent of the primary settling tank 2 and the mixture delivered to said flocculation tank 4. Also, if desired, a chemical coagulant may be added to the flocculation tank 4, as for example, to the influent thereof, and may be mixed with the effluent from the primary settling tank 2. The mechanical agitation mechanisms of the flocculation tank 4 insure a thorough mixing of the active activated sludge which has a sufficiently high ability to absorb and oxidize the organic matter flowing in the effluent from the primary settling tank 2 into said flocculation tank 4. Consequently there will be a high and very effective absorption of the organic matter in the flocculation tank 4. The effluent from the flocculation tank 4 then flows to the final settling tank 5 where the activated sludge settles the effluent flowing from said final settling tank 5, as for example, to a river. The settled activated sludge in the final settling tank 5 is collected and delivered, for example pumped, in part to the aeration tank 6, the excess being delivered to the concentration tank 7 where the activated sludge is concentrated, the concentrated sludge being delivered to the digester 3, the liquid or effluent being delivered to the influent of the primary settling tank 2.

The percentage of returned activated sludge delivered to the aeration tank 6 and the concentration tank 7 may be controlled by appropriate valves, gates or pumps but sufficient liquid is withdrawn to deliver a dilute mixture to aeration tank 6. The solids content in this mixture should not exceed 0.5%. The activated sludge in said aeration tank 6 is aerated to a degree to make it extremely active and preferably it is fed food from the effluent of the primary settling tank 2, sufficient to develop a high oxidizing ability. The effluent from the aeration tank 6 is then delivered to the flocculation tank 4 where it acts as above described.

As a typical illustration, but by no means as limiting, it may be pointed out that the detention period in the primary settling tank 2 may be of the order of one-half hour and a similar detention period may be provided in the flocculation tank 4. Said tank 4 may vary in size in accordance with the required degree of purification required. These two detention periods may not be exactly the same. The detention period in the final settling tank 5 may be of the order of one and one-half hours. The detention period in the aeration tank 6 may be of the order of one to two hours. This is a very appreciable reduction in detention period in the aeration tank 6 as compared with a standard activated sludge system where detention periods in excess of six to eight hours are not uncommon.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. A sewage treating system including a primary settling tank, a mechanically agitating mixer positioned to receive the effluent from said primary settling tank, a secondary settling tank positioned to receive the effluent from said mixer, means for removing sludge from said secondary settling tank, means for diverting part of said sludge and feeding it to the influent of said mixer, and means for aerating the diverted sludge.

2. A sewage treating system including a primary settling tank, a mechanically agitating mixer positioned to receive the effluent from said primary settling tank, a secondary settling tank positioned to receive the effluent from said mixer, means for removing sludge from said secondary settling tank, means for diverting part of said sludge and feeding it to said mixer, and means for aerating the diverted sludge.

3. A sewage treating system including a primary settling tank, a mechanically agitating mixer positioned to receive the effluent from said primary settling tank, a secondary settling tank positioned to receive the effluent from said mixer, means for removing dilute sludge from said secondary settling tank, and means for diverting part of said sludge, aerating it, and feeding it to the influent of said mixer.

4. Sewage treating apparatus including a primary settling tank and a secondary settling tank, mechanically driven agitating flocculation means interposed in the sewage flow between said tanks, a digester, means for delivering settled sludge from both of said settling tanks to said digester, means for taking a part of the sludge from one of said tanks and returning it to said flocculation means, and means for aerating the returned sludge before it reaches said flocculation means.

5. Sewage treating apparatus including a primary settling tank and a secondary settling tank, mechanical flocculation means interposed in the sewage flow between said tanks, a digester, means for delivering settled sludge from both of said settling tanks to said digester, means for taking a part of the sludge from said secondary settling tank and returning it to said flocculation means, and means for aerating the returned sludge before it reaches said flocculation means.

6. Sewage treating apparatus including a primary settling tank, a secondary settling tank, a mechanically driven flocculation and mixing tank, an aeration tank and a digester, sewage flow connections connecting successively said primary settling tank, said flocculation and mixing tank and said secondary settling tank, means for feeding sewage liquid from said primary settling tank to said aeration tank, means for removing sludge from said secondary tank and delivering part of it to said digester, means for delivering another part of said sludge to said aeration tank, and means for delivering effluent from said aeration tank to said flocculation and mixing tank.

7. Sewage treating apparatus including a primary settling tank, a secondary settling tank, a mechanical agitating flocculation tank, an aeration tank and a digester, sewage flow connections connecting successively said primary settling tank, said flocculation tank and said secondary settling tank, means for removing sludge from said secondary tank and delivering part of it to said digester, means for delivering another part of said sludge to said aeration tank, and means for delivering effluent from said aeration tank to said flocculation tank.

8. The method of treating sewage which includes settling organic matter successively in separate tanks, agitating the liquid by mechanical agitation while it flows between said tanks, returning part of the sludge from the last of said tanks in the flow stream to the agitating zone, and aerating said returned sludge while it is being so returned.

9. The method of treating sewage which includes flowing the sewage successively through an agitating zone and then a settling zone, mechanically agitating the sewage in the agitating zone, removing dilute settled sludge from the settling zone and aerating part of it and concentrating another part of it, delivering the aerated part to the agitating zone where it is agitated with raw incoming sewage, and digesting the concentrated part of said sludge.

10. The method of treating sewage which includes the successive stages of primary settling to remove heavy organic matter, mechanical agitation of the effluent and final settling, and further includes digesting at least part of the organic sludge settled in both said primary and final settling stages after concentrating the sludge from the final settling stage, and returning part of the sludge from said final stage to the agitating stage after aerating it.

11. The method of treating sewage which includes the successive stages of primary settling to remove heavy organic matter, mechanical agitation of the effluent and final settling, and further includes digesting at least part of the organic sludge settled in both said primary and final settling stages, and returning part of the sludge from said final stage to the agitating stage after aerating it.

12. The method of treating sewage which comprises creating a sewage flow, directing at least part of said sewage flow through an agitating zone and then a settling zone, agitating the sewage in said agitating zone, collecting sludge in said settling zone and delivering it to an aerating zone, aerating said sludge in said aerating zone, diverting some sewage before it reaches said agitating zone and flowing it to said aerating zone for aeration with said sludge, and delivering the aerated sewage and sludge from said aerating zone to said agitating zone for agitation therein with the raw sewage.

13. The method of treating sewage which comprises creating a main flow of sewage, directing said main flow through a settling tank, removing the sludge, aerating said sludge in an aerator functionally removed from the main sewage flow, feeding sewage from said main flow to said aerator, and delivering the effluent from said aerator to the main sewage flow before it flows into said settling tank.

14. A sewage system including a mixer, means feeding sewage to said mixer, a settling tank, means feeding sewage to said settling tank from said mixer, an aerator, means feeding sludge from said settling tank to said aerator, means also feeding sewage from said mixer feeding means to said aerator, and means feeding the output of said aerator to said mixer.

15. A sewage system including a settling tank, means directing sewage to said tank, an aerator, means feeding sludge from said settling tank to said aerator, means also feeding sewage from said first named means to said aerator, and means feeding the output of said aerator to said first named means.

SAMUEL L. TOLMAN.